(12) United States Patent
Musgrove et al.

(10) Patent No.: US 9,283,643 B2
(45) Date of Patent: Mar. 15, 2016

(54) REMOVAL OF LIQUID FROM AIRFOIL OF EQUIPMENT HAVING GAS-LIQUID FLOWS

(71) Applicant: Southwest Research Institute, San Antonio, TX (US)

(72) Inventors: Grant O. Musgrove, San Antonio, TX (US); David L. Ransom, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 231 days.

(21) Appl. No.: 14/092,976

(22) Filed: Nov. 28, 2013

(65) Prior Publication Data

US 2015/0143695 A1    May 28, 2015

(51) Int. Cl.
| | |
|---|---|
| *F04D 29/28* | (2006.01) |
| *B23P 15/02* | (2006.01) |
| *F04D 29/68* | (2006.01) |
| *F04D 31/00* | (2006.01) |
| *F04D 29/70* | (2006.01) |

(52) U.S. Cl.
CPC ............... *B23P 15/02* (2013.01); *F04D 29/284* (2013.01); *F04D 29/684* (2013.01); *F04D 29/706* (2013.01); *F04D 31/00* (2013.01); *Y10T 29/49236* (2015.01)

(58) Field of Classification Search
CPC ....... B23P 15/02; F04D 31/00; F04D 29/284; F04D 29/706; F04D 29/684
See application file for complete search history.

(56) References Cited

U.S. PATENT DOCUMENTS

| | | | |
|---|---|---|---|
| 7,559,745 B2 | 7/2009 | Falk et al. | |
| 7,722,316 B2 | 5/2010 | Scarcini et al. | |
| 8,806,746 B2 * | 8/2014 | Pasupuleti | F03D 11/0016 156/389 |
| 2010/0080711 A1 | 4/2010 | Page et al. | |

* cited by examiner

*Primary Examiner* — Richard Chang
(74) *Attorney, Agent, or Firm* — Livingston Law Firm

(57) ABSTRACT

A method of removing liquid from the surface of an airfoil of equipment that handles a wet gas mixture. The airfoil has at least one interior passage, such as a bore, for travel of air or other gas through the interior of the airfoil. A series of holes are cross drilled from one or both exterior surfaces of the airfoil to the passage. Forced air or other gas is introduced into the passage such that the air or other gas is expelled to the surface of the airfoil via the holes, thereby removing the surface liquid.

9 Claims, 5 Drawing Sheets

REMOVAL OF LIQUID FROM AIRFOIL OF EQUIPMENT HAVING GAS-LIQUID FLOWS

TECHNICAL FIELD OF THE INVENTION

This invention relates to centrifugal and axial compressors and other equipment that handle a gas flow that can include liquid, and more particularly to improving the aerodynamics of such equipment.

BACKGROUND OF THE INVENTION

During upstream production of natural gas, the gas brought to the surface is compressed so that it can be injected into a pipeline and transported elsewhere. Various types of natural gas compressors may be used for this purpose.

Sometimes the gas brought to the surface is a mixture having a small amount of liquid hydrocarbons, typically up to 5% volume fraction. This gas-liquid mixture is sometimes referred to as "wet gas". Because a natural gas compressor is designed for dry gas only, the presence of the liquid degrades the performance of the compressor to require much more power. By requiring more power, large drivers are needed that increase the cost and footprint of the compressor system.

A conventional solution to the wet gas problem is to avoid the mixed phase flow by separating the gas and liquid at the well-head. However, the separation equipment required to do this increases both the cost and footprint of the compression system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a method of solving the gas-liquid problem encountered by various gas handling equipment, such as compressors and turbines that operate by directing a gas past one or more airfoils. Examples of such equipment are centrifugal and axial gas compressors, and radial and axial turbines. Aircraft wings when flying through rain also encounter wet-gas airfoil boundary issues, as do wind turbine and helicopter blades.

The term "airfoil" is used herein in a broad sense, and includes, without limitation, any blade shaped fin, vane, or blade, such as might be used by various gas handling equipment. The terminology for components having an airfoil surface may vary depending on the type of equipment. For example, various compressors have rotating impellers, with "fins" or "blades". Likewise, a turbine has at least one rotor assembly, which is a shaft with "fins" or "blades" attached. For purposes of this description, these various components having airfoil surfaces may be collectively referred to as "airfoils".

The object of the method is to remove liquid from, or prevent liquid from forming on, the airfoil surface. This improves airfoil aerodynamics when there is a gas-liquid flow, by improving lift and reducing drag.

The method modifies the compressor or other equipment such that wet gas has little effect on performance. In the case of natural gas compressors, the method can be used to keep liquid hydrocarbons off the airfoils. In the case of turbines, the method can be used to keep condensed steam off the airfoils.

Figure 1:
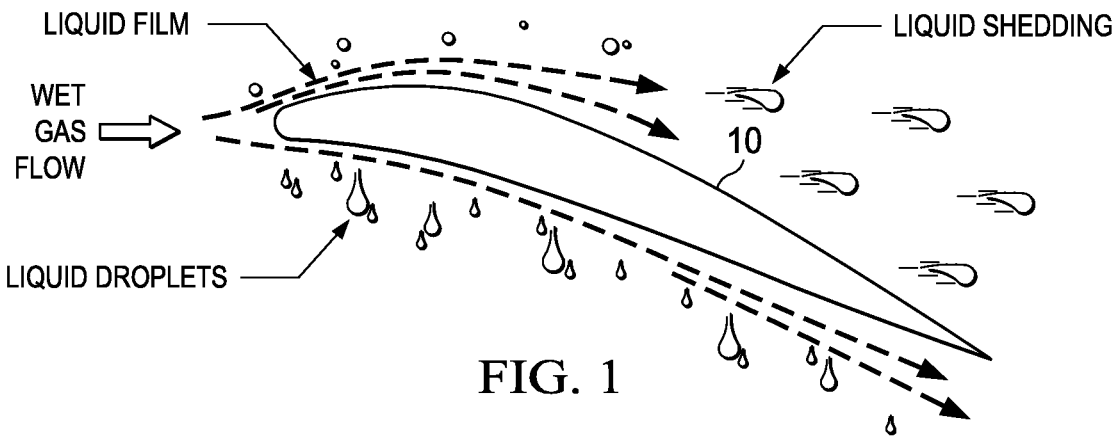
FIG. 1 illustrates one effect of wet gas flows on the performance of an airfoil, specifically, how a liquid film can develop on the airfoil surface.
Figure 2:
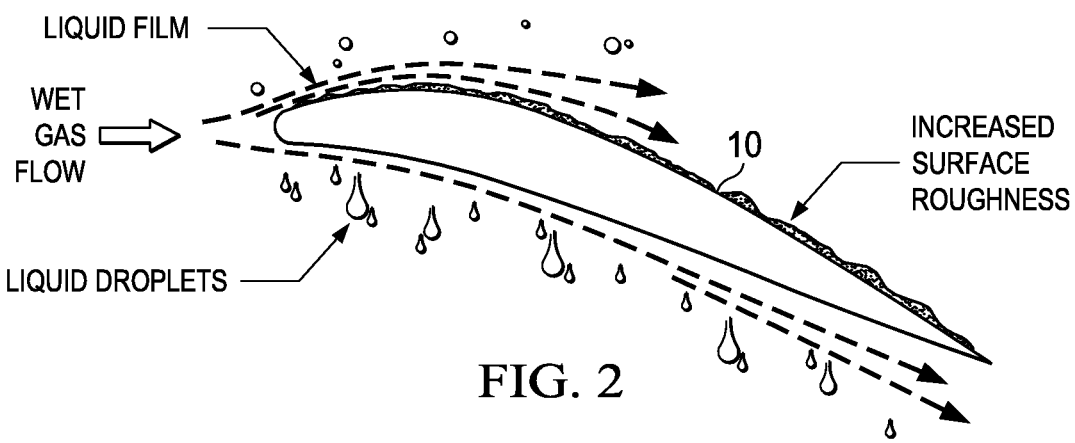
FIG. 2 illustrates another effect of wet gas flows on the performance of an airfoil, specifically how a liquid film on the airfoil increases the airfoil surface roughness.

FIGS. 1 and 2 illustrate the interaction of wet gas flows near the airfoil 10 surface. In FIG. 1, liquid accumulation on the airfoil surface results in a film that can shed from the surface in the form of droplets. Additionally, the liquid film layer contributes to premature boundary layer separation. In FIG. 2, a liquid film on the airfoil 10 has increased the surface roughness.

In a compressor, the loss of lift and increase of drag translates to decreased efficiency. Additional power is required by the compressor to overcome the airfoil losses. The additional power required to compress wet gas can be reduced by removing the liquid from the airfoil surface.

Figure 3:
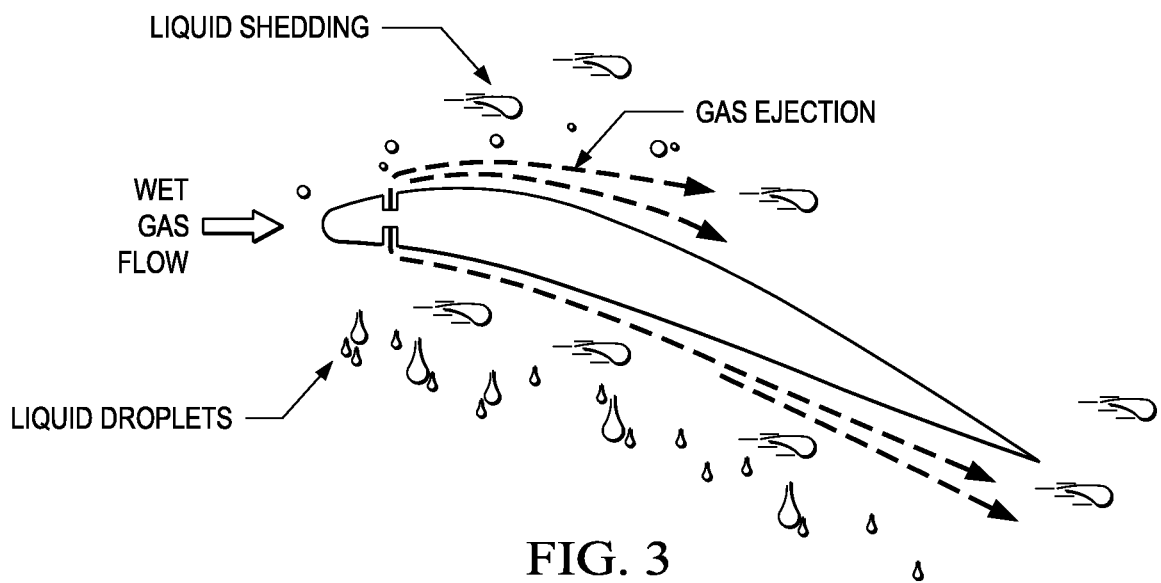
FIG. 3 illustrates how gas ejection from the interior of the airfoil may be used to remove the liquid from the airfoil surface.

FIG. 3 illustrates how gas ejection from the interior of the airfoil may be used to remove the liquid from the airfoil surface. This gas ejection along the surface of the airfoil results in control of the airfoil boundary layer. The effect is to mitigate the effects of the liquid phase on the compressor aerodynamics. The method can be implemented by using boundary layer control on the airfoil surface, such as by blowing pressurized gas along the airfoil surface to provide a buffer layer that prevents the liquid from interacting with the airfoil surface.

Figure 4:
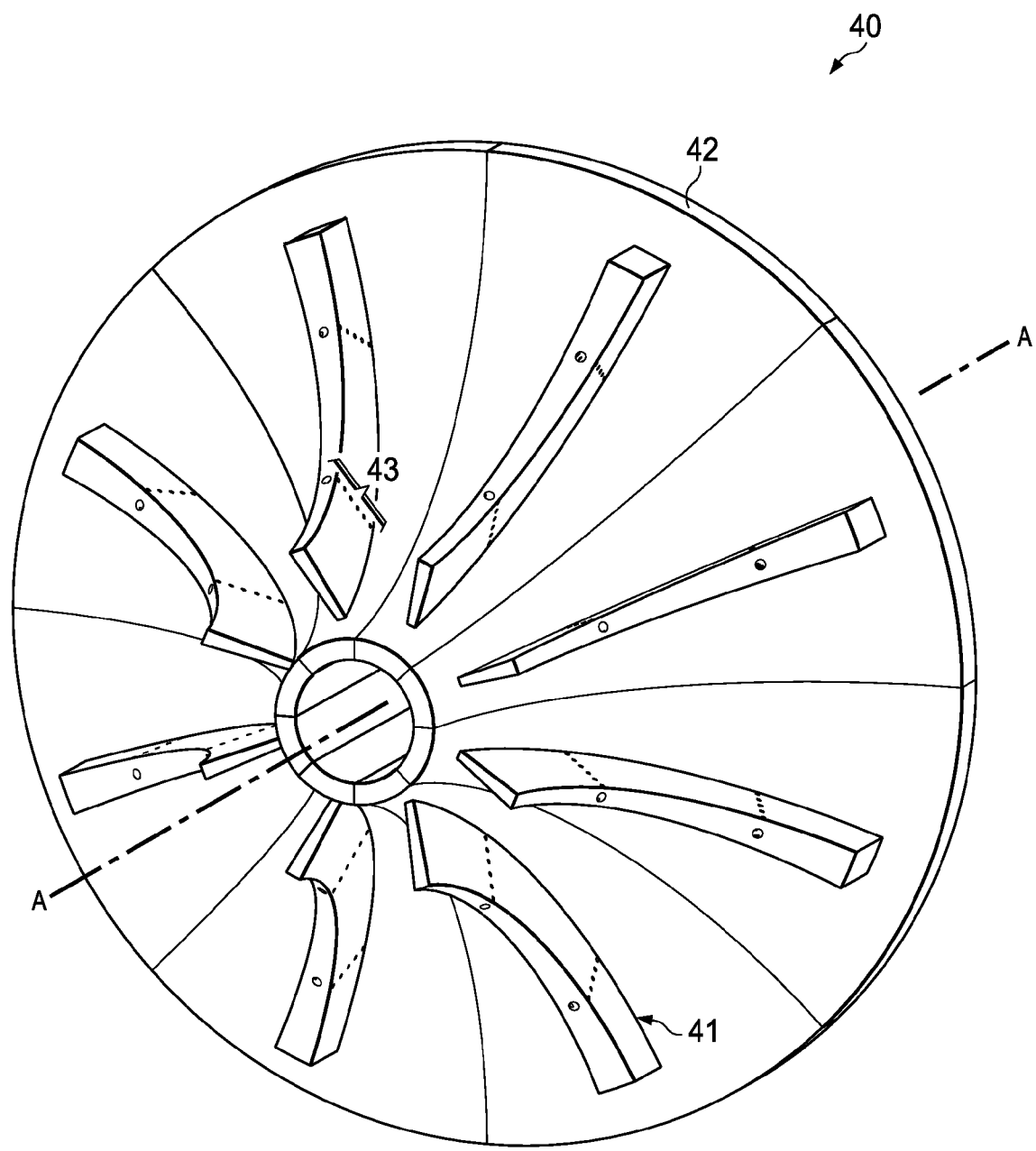
FIG. 4 illustrates an impeller of a centrifugal compressor.

FIG. 4 illustrates an impeller 40 of a centrifugal compressor (sometimes called a radial compressor). The use of this impeller is for purposes of example, and the same concepts can be applied to any other equipment having one or more airfoils. For example, the same concepts can be applied to axial compressors, which are similar to centrifugal compressors in that they are rotating airfoil-based compressors, as well as to turbines.

The impeller 40 is the key component that makes a compressor centrifugal. The impeller's rotating set of blades 41 converts rotation energy into pressure and momentum energy in the working gas. Blades 41 protrude from an impeller base 42. Impeller blades 41 may have various geometries, and are often designed with a "backsweep" in the blade shape.

Each blade 41 has one or more rows of purge holes 43 across its span. The blade "span" direction is defined from the impeller hub to the blade tip. As explained below, these purge holes provide fluid communication between the exterior of the blade 41 and a passageway within the interior of the blade 41. Via the passageway, air is ejected out the purge holes onto the surface of the airfoil, in accordance with the concept described above in connection with FIG. 3.

Figure 5:
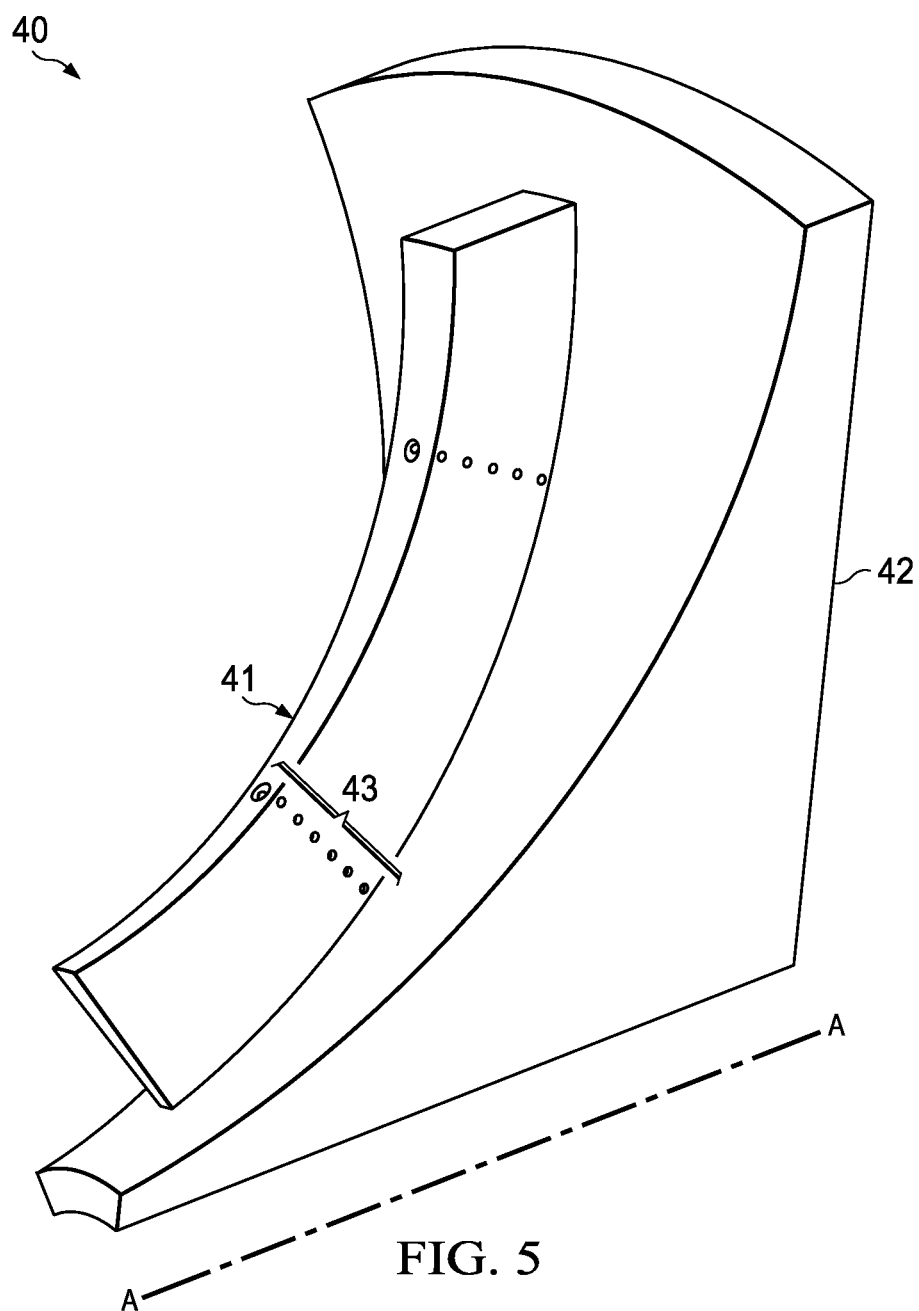
FIG. 5 illustrates a portion of the impeller along axis A-A of FIG. 4, specifically the outer surface of a blade.
Figure 6:
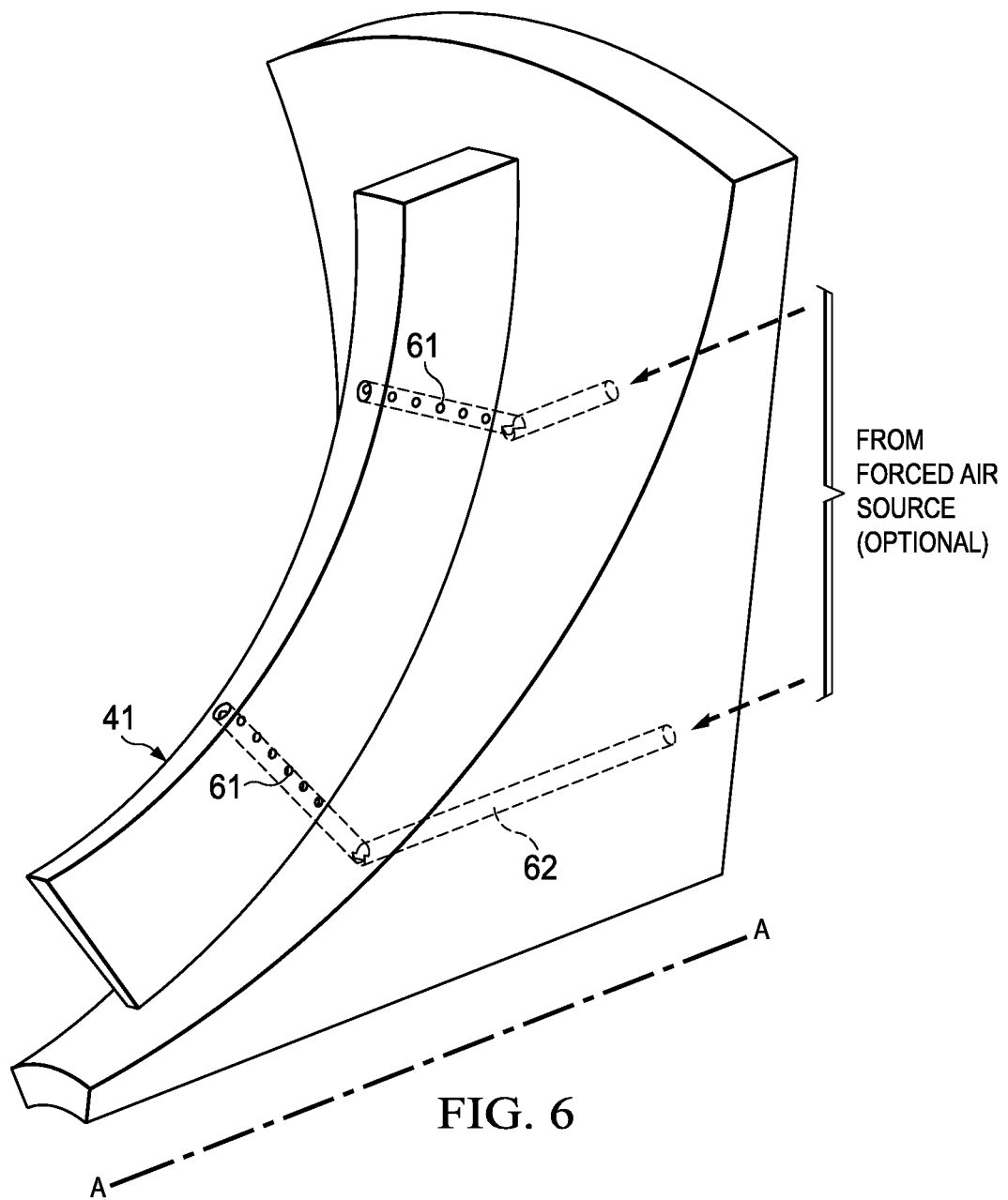
FIG. 6 illustrates a portion of the impeller along axis A-A of FIG. 4, specifically the interior of a blade.

FIGS. 5 and 6 each illustrate a portion of impeller 40 along axis A-A of FIG. 4. FIG. 5 illustrates the outer surface of a blade 42, and FIG. 6 illustrates the interior of the blade.

These figures show in further detail how each blade 41 has purge holes 43 that open to its exterior surface. In the example of this description, each blade 41 has two rows of purge holes, with the purge holes of each row being evenly spaced.

Many other arrangements of the purge holes are possible. Because the flow along the span of an airfoil can generally be the same, purge holes are beneficially placed along the blade width (perpendicular to the flow direction). However, in various embodiments, it may be desirable to rotate the rows of purge holes 90 degrees so that they are along the flow direction. Or, the rows could be angled relative to the flow direction.

Also, the purge holes need not be in rows, and could be in an array pattern, evenly or randomly spaced. In this case, a network of bores or other passageways would provide fluid communication from the purge holes to the interior of the airfoil. As with all embodiments, the interior passageways allow air or other gas to be introduced into the interior of the airfoil from an external source and ejected from the purge holes.

Referring to FIG. 6, in the example of this description, the purge holes are open to both sides of each blade 41. For each row of purge holes 43, an associated bore 61 extends upwardly through the interior of the blade 41, generally in the direction of the width of the blade. The purge holes 43 of the associated row of purge holes are in fluid communication with this bore 61.

In FIG. 6, the blade 41 has two sets of purge holes, each set of purge holes being cross drilled to an associated bore 61. In other embodiments, each blade 41 could have only a single set of purge holes and a bore, or could have more than two sets of purge holes and bores.

The size and geometry of bore 61 may vary. In fact, the purge holes 43 could communicate with any hollow interior of the blade. In general, bore 61 could be implemented as any passage for directing forced air to the purge holes that are cross drilled to the bore. Thus, the size and geometry of bore 61 (or other passage) should be designed with this function in mind.

In other embodiments, the bore could be along the length of the airfoil. In this case, the bore would be in fluid communication with purge holes cross drilled to the bore from one or both surfaces of the airfoil. The resulting pattern of purge holes would be rows along the length of the airfoil rather than across its width.

In still other embodiments, the purge holes could be cross drilled to the bore from only one side of the airfoil. This could be either side of the airfoil, depending on the presence of liquid and the desired aerodynamic effect of ejecting gas through the purge holes.

A common feature of all embodiments are a bore or other passage through the plane (lengthwise, widthwise or angled) of the airfoil. This bore is in fluid communication with a series of purge holes cross drilled to the bore from one or both sides of the airfoil. The purge holes are cross drilled to and along the bore, such that the resulting row of purge holes is generally parallel to the bore. The bore further communicates with a forced air source so that air may be expelled from the bore to the outside surface of the airfoil, via the purge holes.

Each blade bore 61 is in further fluid communication with a base bore 62, which extends from the interior end of the blade bore 61 to an exterior surface of the base 62. In some embodiments, this base bore 62 is connected to a forced air source, so that air is ejected onto the airfoil surface of blade 41.

Figure 7:
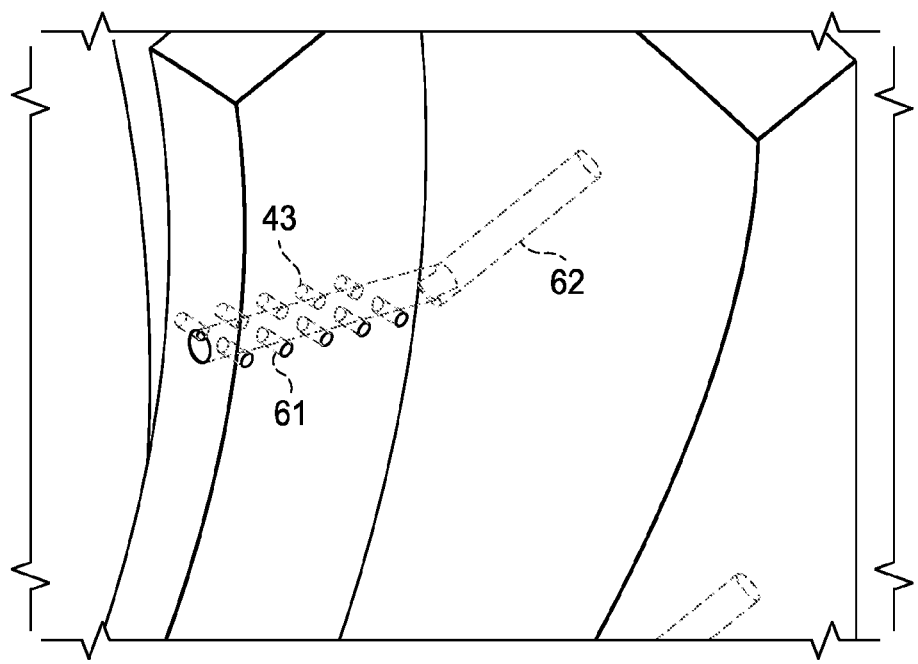
FIG. 7 illustrates the purge holes, blade bore and base bore of FIGS. 4-6 in further detail.

FIG. 7 illustrates purge holes 43, blade bore 61 and base bore 62 in further detail.

In still other embodiments, the base bore 62 could be in communication with a gas suction source. Thus, the use of gas ejection to blow the liquid off the airfoil surface can be replaced with suction to remove the liquid from the airfoil. Vacuum type equipment may be used to provide the suction. Also, as with the ejection method, in some embodiments, the providing of the airflow can be "passive" in the sense that the use of the airfoil provides the suction effect. The suction airflow can be from the airfoil surface, leading back into the purge holes and thus removing liquid from the surface.

Figure 8:
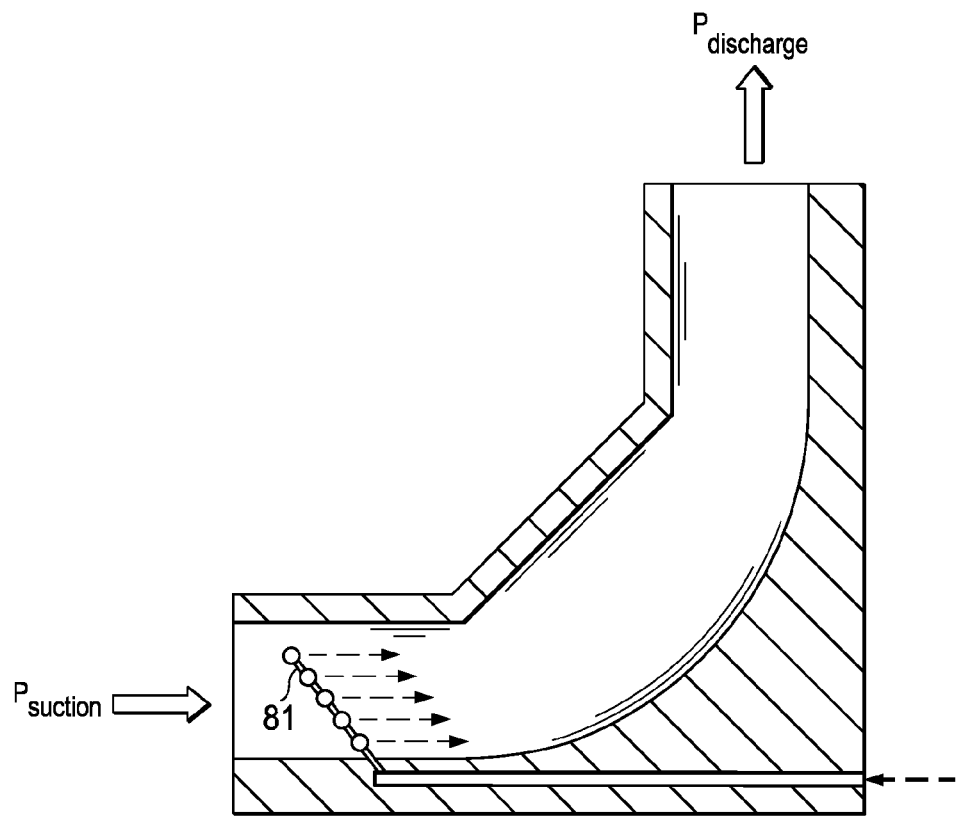
FIG. 8 illustrates a method of using the above-described purge holes, blade bore and base bore with a natural gas compressor.

FIG. 8 illustrates a method of using the above-described purge holes, blade bore and base bore with a natural gas compressor. A cross section of one blade 81 of the impeller is shown, relative to the suction end and discharge end of the gas passage through the compressor. The compressor impeller needs only to have holes cross-drilled from the discharge end of the stage back to the impeller blade since the stage carries its own pressure differential.

What is claimed is:

1. A method of removing liquid from the surface of an airfoil, the airfoil having an upper exterior surface, a lower exterior surface, a generally solid interior, a span dimension and a width dimension, comprising:

drilling at least one passage bore into the generally solid interior of the airfoil, the passage bore extending between the lower exterior surface and the upper exterior surface and across the width or length of the airfoil, the passage bore operable to deliver air or other gas from an external source into the interior of the airfoil;

wherein the passage bore has a port for receiving air or other gas into the passage bore;

cross drilling a series of holes from the lower exterior surface or from the upper exterior surface, or from both, to the passage bore, in a direction generally perpendicular to the passage bore, and such that air or other gas may flow through the passage bore to the exterior surface of the airfoil via the holes; and providing air or other gas into the port of the passage bore such that the air or other gas flows through the passage bore prior to being expelled to the upper exterior surface or the lower exterior surface via the holes.

2. The method of claim 1, wherein the at least one passage is one or more generally cylindrical bores.

3. The method of claim 2, wherein the bores are across the span of the airfoil and the cross drilling step is performed such that the holes form one or more rows across the width of the airfoil.

4. The method of claim 2, wherein the bores are across the length of the airfoil and the cross drilling step is performed such that the holes form one or more rows along the length of the airfoil.

5. The method of claim 1, wherein the cross drilling step is performed such that holes are cross drilled from only one surface of the airfoil.

6. The method of claim 1, wherein the cross drilling step is performed such that holes are cross drilled from both surfaces of the airfoil.

7. The method of claim 1, wherein the airfoil is part of an impeller, and the step of providing the air or other gas is performed by a pressure differential from one side of the impeller to the other during operation of the compressor.

8. The method of claim 1, wherein the step of providing the air or other gas is performed by providing forced air from an external source.

9. The method of claim 1, wherein the step of providing air or other gas is performed by providing a vacuum source.

\* \* \* \* \*